United States Patent [19]

Giebel et al.

[11] Patent Number: 5,299,553

[45] Date of Patent: Apr. 5, 1994

[54] KETTLE GRILL AND ASH-CATCHER ASSEMBLY THEREFOR

[75] Inventors: Michael Giebel; David Landis, both of Joplin; Tienchai Puangnak; Randy Love, both of Neosho, all of Mo.

[73] Assignee: Sunbeam Corporation, Providence, R.I.

[21] Appl. No.: 983,440

[22] Filed: Dec. 1, 1992

[51] Int. Cl.⁵ .............................................. F24B 3/00
[52] U.S. Cl. ................................ 126/25 R; 126/242
[58] Field of Search ................... 126/25 R, 9 R, 242

[56] References Cited

U.S. PATENT DOCUMENTS

| | | |
|---|---|---|
| D. 280,282 | 8/1985 | Erbach et al. . |
| D. 284,929 | 8/1986 | Schlosser et al. . |
| D. 291,855 | 9/1987 | Erbach et al. . |
| D. 293,067 | 12/1987 | Stephen et al. . |
| D. 293,191 | 12/1987 | Stephen et al. . |
| D. 298,406 | 11/1988 | Stephen et al. . |
| D. 316,355 | 4/1991 | Stephen et al. . |
| 101,177 | 3/1870 | Stevenson . |
| 678,024 | 7/1901 | Norpis . |
| 1,055,311 | 3/1913 | Blount . |
| 2,932,479 | 4/1960 | Leach ............................. 126/25 R |
| 3,330,266 | 7/1967 | Stephen ......................... 126/25 R |
| 3,538,906 | 11/1970 | Heraty et al. . |
| 3,611,915 | 10/1971 | Glaser et al. . |
| 3,714,937 | 2/1973 | Linstead . |
| 3,734,076 | 5/1973 | Kizoil . |
| 3,974,821 | 8/1976 | Storandt . |
| 4,281,633 | 4/1981 | Wackerman . |
| 4,302,181 | 11/1981 | Schlosser . |
| 4,382,432 | 5/1983 | Lizdas . |
| 4,390,002 | 6/1983 | Dailey, III . |
| 4,453,530 | 6/1984 | Schlosser . |
| 4,458,585 | 7/1984 | Erbach . |
| 4,463,746 | 8/1984 | Knuth et al. . |
| 4,523,574 | 6/1985 | Schlosser . |
| 4,535,749 | 8/1985 | Schlosser . |
| 4,593,676 | 6/1986 | Wackerman . |
| 4,603,679 | 8/1986 | Ogden ............................. 126/25 R |
| 4,635,613 | 1/1987 | Tucker et al. . |
| 4,677,964 | 7/1987 | Lohmeyer et al. . |
| 4,688,541 | 8/1987 | Stephen et al. . |
| 4,727,853 | 3/1988 | Stephen et al. . |
| 4,777,927 | 10/1988 | Stephen et al. . |
| 4,829,978 | 5/1989 | Schlosser et al. . |
| 4,836,179 | 6/1979 | Schlosser et al. . |
| 4,860,724 | 8/1989 | Schlosser et al. . |
| 4,924,845 | 5/1990 | Johnson et al. . |
| 4,926,841 | 5/1990 | Woolf . |
| 4,941,817 | 7/1990 | Schlosser . |
| 4,942,862 | 7/1990 | Alden et al. . |
| 5,027,788 | 7/1991 | Schlosser . |
| 5,036,832 | 8/1991 | Schlosser . |

FOREIGN PATENT DOCUMENTS 2417964 10/1979 France .

*Primary Examiner*—Carroll B. Dority
*Attorney, Agent, or Firm*—Michael J. Kline

[57] ABSTRACT

A barbecue kettle grill including an ash-catcher assembly for catching ash and debris falling through a centrally disposed opening in the bottom of the kettle is disclosed. The ash-catcher assembly further allows the opening and closing of an air draft in the bottom of the kettle. The kettle further includes a lid catch bracket for hanging the kettle lid on the base of the kettle when not in use, one or more handles having a substantially hollow interior supported by internal support ribs and attached to the kettle with insulating washers disposed therebetween in order to minimize heat transfer to the handles. The kettle grill further includes four legs comprised of two-legged tubular members, each having an attachment flange joining the two legs for attachment to the base of the kettle.

9 Claims, 6 Drawing Sheets

KETTLE GRILL AND ASH-CATCHER ASSEMBLY THEREFOR

FIELD OF THE INVENTION

The present invention relates to kettle-type grills, and more particularly relates ash-catcher assemblies, top lid catch brackets, handles, and tubular legs for use in connection with kettle-type grills.

BRIEF DESCRIPTION OF PRIOR ART

Kettle-type grills are widely used today, primarily because of their portability, relative low price, ease of assembly and use. The traditional kettle-type barbecue grill consists of a generally semi-hemispherical bottom bowl that has a circular open top and cooking grid slightly below the upper rim of the bowl. A generally semi-hemispherical top cover can be placed on the bottom bowl to allow heat retention and/or smoking of food being cooked within. The bowl is generally supported on a tube-in-socket tripod leg arrangement.

Traditional barbecue kettle grills have been designed for burning charcoal as a heat source and have a second grid for supporting the charcoal below the cooking surface. Both the bowl and cover have vent openings to provide the necessary oxygen for combustion of the charcoal while the cover is closed. The vent openings in the bowl have traditionally been used for disposing of the ashes that accumulate in the bottom of the chamber.

One type of barbecue kettle grill that has been used in the past is illustrated in U.S. Pat. No. 4,576,140. This kettle utilizes tripod legs which support an ash-catcher pan positioned below the kettle bowl of the grill. During operation, the charcoal on the second grid burns, turns to ash, and falls to the bottom of the bowl. Also, grease or cooking fat, pieces of food being cooked, chunks of hot coal and other objects fall to the bottom of the bowl. U.S. Pat. No. 4,416,248 discloses apparatus for scraping and disposing ash and debris from the bottom of the kettle and for controlling air intake into the bottom of the kettle.

The kettle-type grills of the prior art, including those previously described, have not been without problems. Because of the top-heavy nature of such grills, especially when loaded with charcoal and food, the tube-in-socket tripod legs tend to wobble and render the kettle grill unstable, and indeed, susceptible to tipping over.

Traditional ash-catcher assemblies such as those disclosed in U.S. Pat. No. 4,576,140; U.S. Pat. No. 4,763,640; U.S. Pat. No. 4,741,322; U.S. Pat. No. 4,498,452; and U.S. Pat. Des. 278,021, all have the distinct disadvantage of being positioned at a distance below the opening in the kettle bowl such that any breeze causes ash falling through the bowl to be disbursed away from the ash-catching pan. Additionally, nudging or bumping the grill assembly or stronger gusts of wind can cause the collected ash to be dumped or otherwise fall from the ash-catcher pan.

Ash-catcher pans such as those disclosed in U.S. Pat. No. 4,576,140, are difficult to install, rely on cumbersome spring clips, and are difficult to remove, in view of their positioning within the three tripod legs above the spring clips. The failure to adequately collect falling debris and ash can cause a fire hazard if there exists a risk of fire to the surround environment, for example, individuals living in apartment complexes with wooden balconies, campers, and picnic areas are almost always concerned about ash and debris escaping into the atmosphere. Further, it is inescapable that uncollected ash can, unfortunately, be messy and dirty.

It is therefore, desireable, to provide a means for more readily collecting and disposing of ash from kettle grills.

An additional problem of the prior art grills such as those disclosed in U.S. patent 4,416,268 is the tendency of ash and other debris to clog the slot-type openings in the base of the bowl and the tendency of such debris to wedge beneath the apparatus such as splines, that are used to scrape the ash from the kettle bowl. This causes the splines to lose effectiveness and indeed occasionally become inoperable if the ash debris wedges too tightly under the splines.

Attempts to solve some of the aforementioned problems have met with only partial success. For example, U.S. Pat. No. 5,036,832 discloses an ash-catcher assembly with a cylindrical basket and mounting ring for preventing the blowing ash problem previously discussed. This apparatus, however, continues to suffer from the spline clogging problems mentioned, as well as obvious problems associated with a device having two separate handles for performing two related functions; one for vent opening/ash scraping, the other for ash collection and removal.

It is, therefore, desireable to provide a kettle-type grill that solves some or all of the above-referenced problems inherent in prior art kettle grills.

SUMMARY OF THE INVENTION

An ash-catcher assembly has been developed for use in conjunction with a barbecue grill, the ash-catcher assembly comprising an ash-catcher tray positioned below an opening in the grill base, the opening being sufficiently sized and positioned to allow ashes from the heat source used within the grill to fall through the opening and into the ash-catcher pan. The ash-catcher pan is slidably and rotatably supported by brackets positioned below the grill base. The ash-catcher pan further includes a handle for moving the ash-catcher pan to a closed air draft position and an open air draft position with respect to the opening in the grill base.

In a highly preferred embodiment of the invention, the ash-catcher pan includes at least one lip about the periphery of the pan, the lip having a wide end tapering to a narrow end, the wide end corresponding with a closed air draft position, and the narrow end corresponding with an opened air draft position. A plurality of brackets supporting the pan by engagement with the pan lip is spaced about the periphery of the opening in the base. Each bracket has a lip. engaging flange having a taper substantially corresponding to the taper of the pan lip, which allows the lip-engaging flange to slidably support the pan lip such that when the ash-catcher pan handle is rotated, the pan moves up or down with respect to the base, closing or opening the air draft.

In another embodiment of the invention, a kettle grill is provided with a lid catch bracket mounted to the internal surface of the lid for allowing the lid to be hung on the base of the grill.

In still another embodiment of the invention, at least one handle is attached to the kettle grill, the handle comprising a phenolic material having a hollow interior supported by a plurality of internal support ribs. The handle is separated from the kettle by an insulating washer that, along with the hollow interior, keep the handle relatively cool to the touch.

In still another preferred embodiment of the invention, the kettle grill includes four legs comprising a pair of two-legged tubular members, each attached to the base of the grill by an attachment flange joining the two legs.

Other advantages and aspects of the present invention will become apparent upon reading the following detailed description of the invention and the drawings appended hereto.

DETAILED DESCRIPTION OF THE PREFERRED EMBODIMENTS

Figure 1:
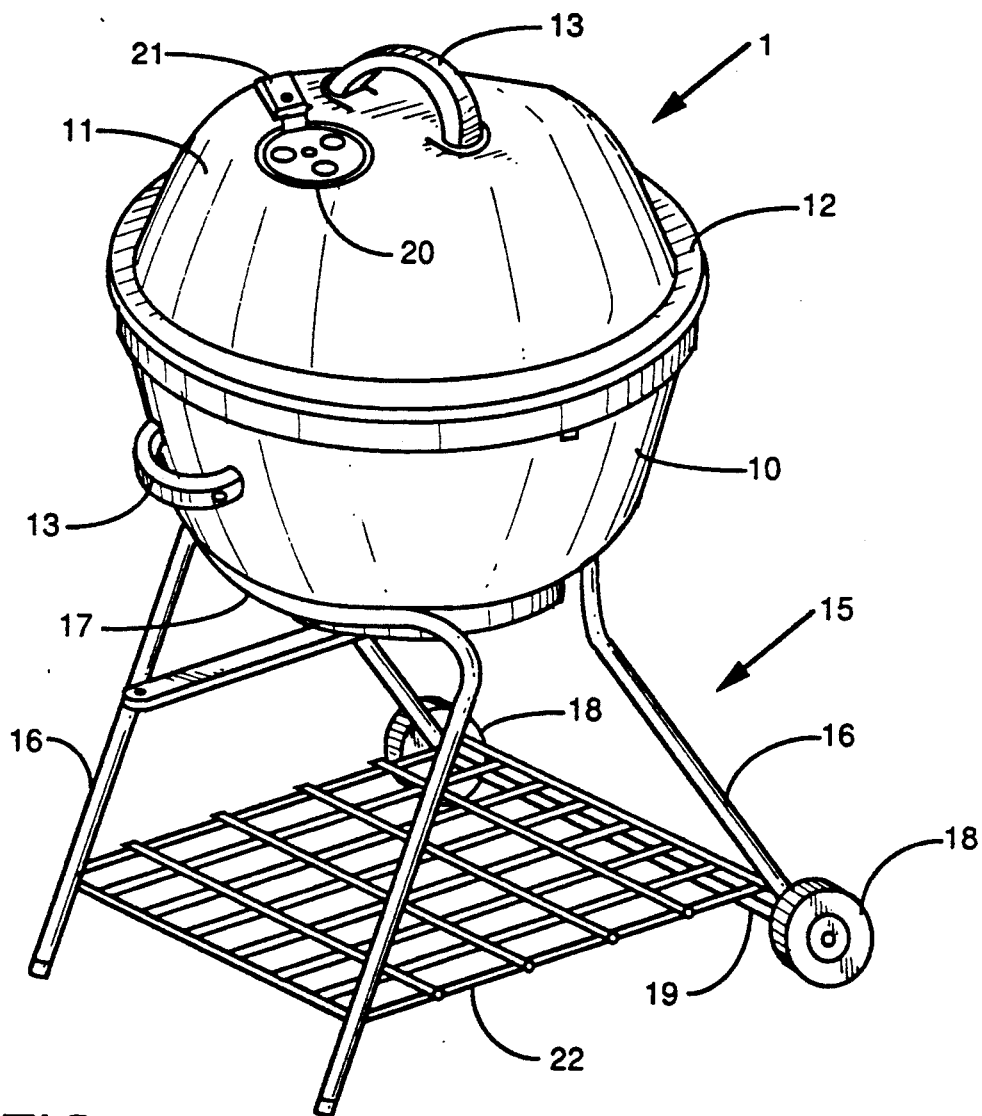
FIG. 1 is a perspective view of a preferred embodiment of a barbecue kettle grill with an ash catcher assembly made in accordance with the teachings of the present invention.

While this invention is susceptible of embodiments in many different forms, there is shown in the drawings and will herein be described in detail preferred embodiments of the invention, with the understanding that the present disclosure is to be considered as an exemplification of the principles of the inventions and is not intended to limit the broad aspects of the invention to the embodiments so illustrated.

Figure 2:
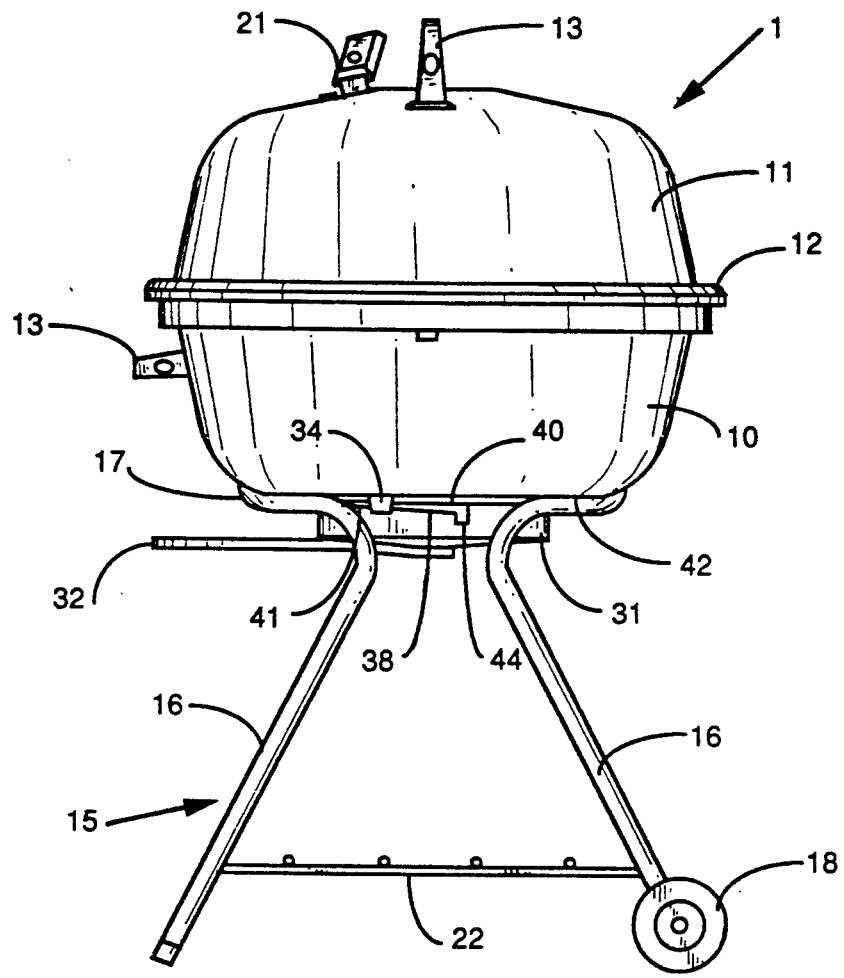
FIG. 2 is a right side elevational view of the barbecue kettle grill illustrated in FIG. 1.

A kettle-type barbecue grill 1, is shown in FIGS. 1 and 2, comprising a generally semi-hemispherical bottom bowl 10 and a generally semi-hemispherical removable cover 11. The bottom bowl 10 and cover are designed to fit snugly together, thereby forming a substantially air-tight seal between them when the assembly is closed as shown. Instrumental in this regard is the use of a rolled lip (not seen) in the bottom bowl 10 and a complimentary flange 12 in the cover 11 for ensuring this air-tight seal. The bowl 10 and cover 11 are preferably formed from porcelain-coated or baked-on enamel-coated metal, such as steel. Handles 13 are provided at the top of the cover 11 and on the side of the bottom bowl 10.

The bottom 10 is supported by a four-leg arrangement generally 15 that includes a pair of two-legged tubular members 16, each tubular member 16 having an attachment flange 17. The legs 16 are attached to the underside 42 of the bottom bowl 10 via the attachment flanges 17, for example through the use of screws secured with hexnuts (not shown). As also illustrated, one set of legs 16 may further include a pair of wheels 18 supported by an axle 19 which passes through each of the legs 16. The kettle legs 16 are secured to the bottom bowl 10 to support the kettle 1 at a convenient height.

As further illustrated in FIGS. 1 and 2, the cover 11 further preferably includes a perforated vent door 20 having a vent door grip 21 that allows the vent door to be opened and closed for venting the kettle grill 1.

The kettle grill 1 further preferably includes a wire mid tray 22 that fits within the four corners defined by the legs 16 and provides for the storage of various objects below the kettle grill 1.

Figure 8:
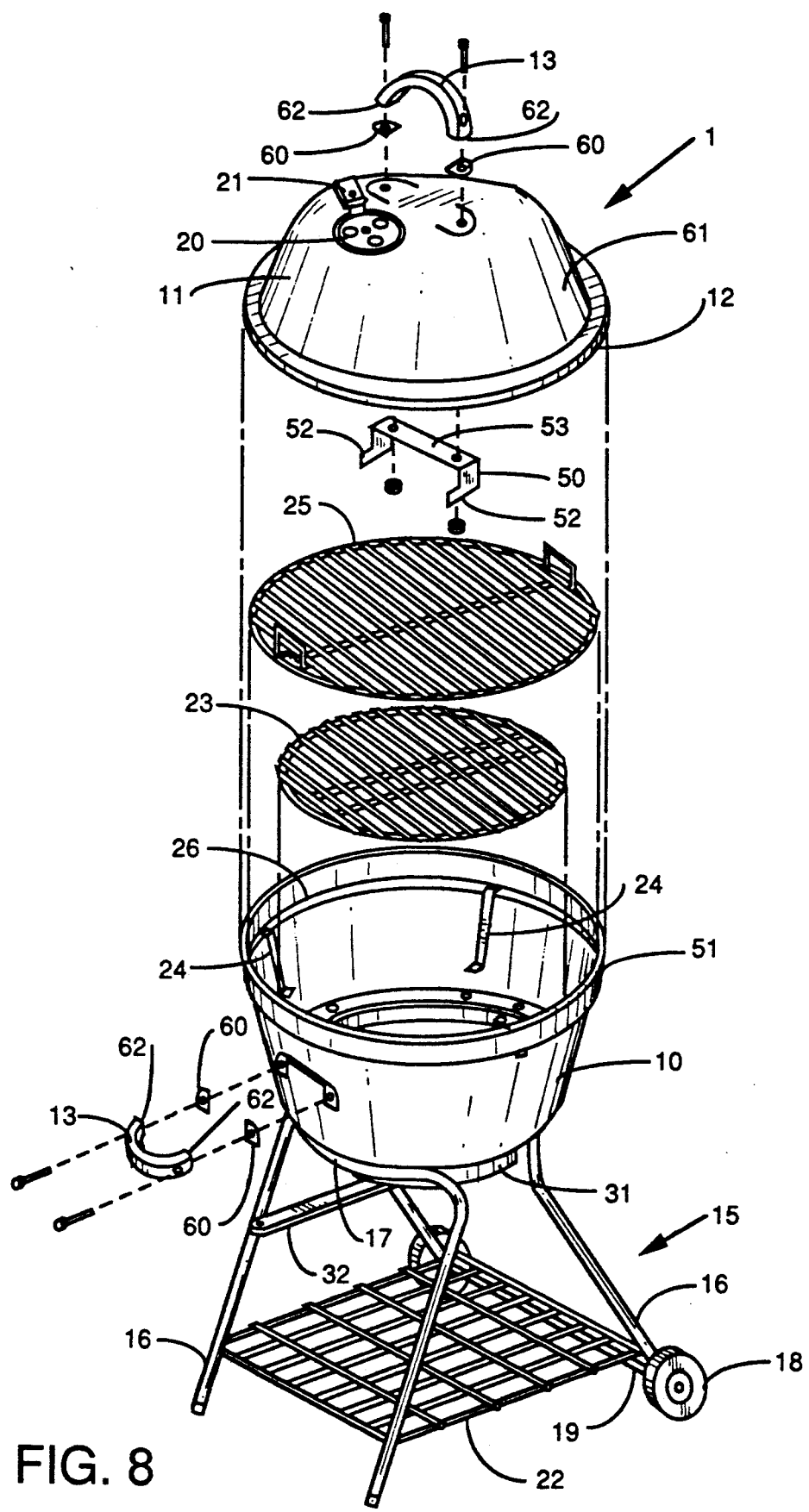
FIG. 8 is a perspective exploded view of the grill kettle of the present invention showing the lid catch bracket and lid handle.

As illustrated in FIG. 8, the bottom bowl 10 of the kettle 1 includes a lower charcoal grate 23 that is supported by a series of grate supports 24 in the bottom of the bottom bowl 10. The bottom bowl 10 further includes a cooking grid 25 supported on a lip contained in the upper portion of the bottom bowl 10.

Figure 3:
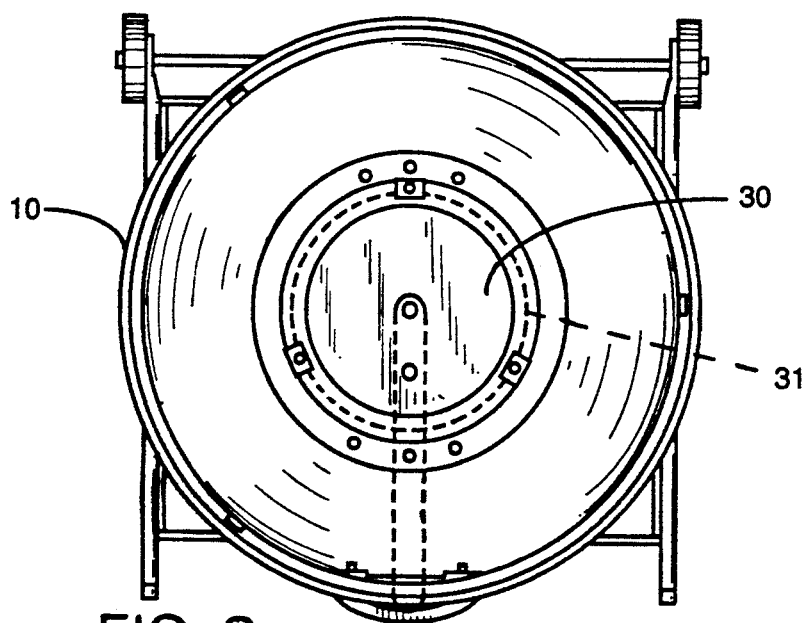
FIG. 3 is a top plan view of the bottom bowl of the barbecue kettle grill of FIG. 1 with the lid removed.

As best seen FIGS. 3 and 8, the bottom bowl 10 includes an opening, preferably comprising a circular opening 30 cut in the center of the bottom bowl 10. This opening allows ash and other debris to fall through the lower charcoal grate 23, through the opening 30, and into an ash-catcher pan 31 positioned below the opening 30. As illustrated in FIGS. 1 and 2, the ash-catcher pan 31 further includes a handle 32. This handle 32 allows the ash-catcher pan 31 to be removed from the grill 1 for disposing of ash collected within the pan 31. This handle 32 also allows the ash-catcher pan 31 to be slidably and rotatably moved with respect to the bottom bowl 10, as will be described in greater detail subsequently. Depending on the direction of rotation of the handle 32, the pan 31 is either raised into a closed air draft position or lowered into an opened air draft position with respect to the circular opening 30 in the bottom of the bowl 10.

Figure 4:
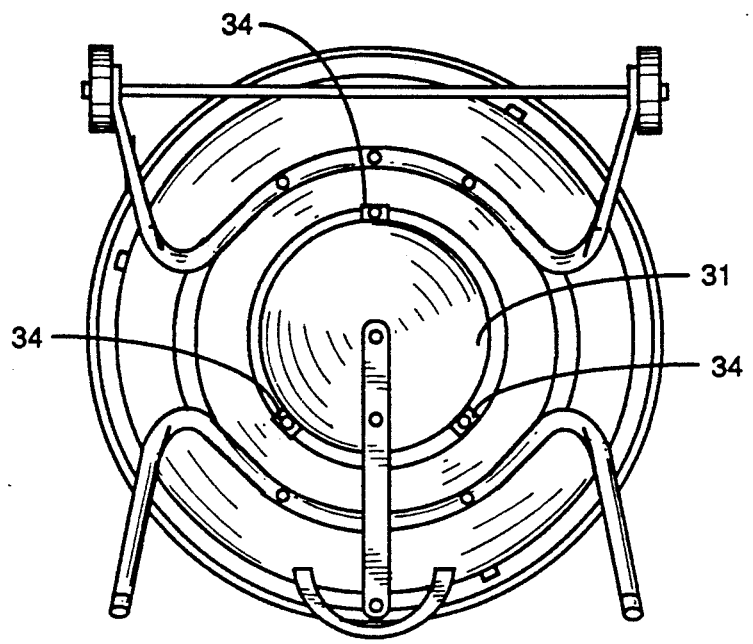
FIG. 4 is a bottom plan view of the bottom bowl of the barbecue kettle grill of FIG. 1.
Figure 6:
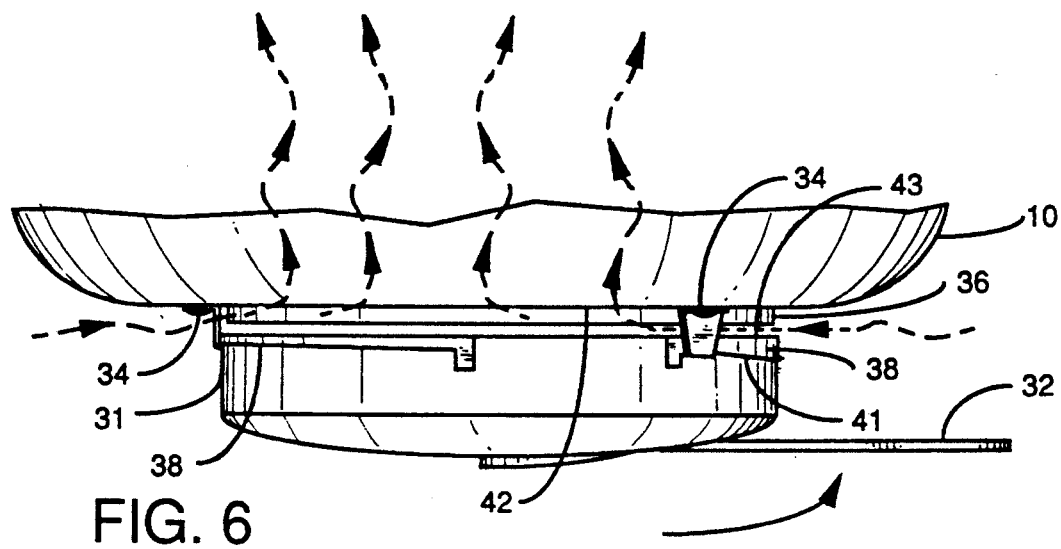
FIG. 6 is an elevational view of the ash-catcher assembly of the present invention in the open air draft position.
Figure 7:
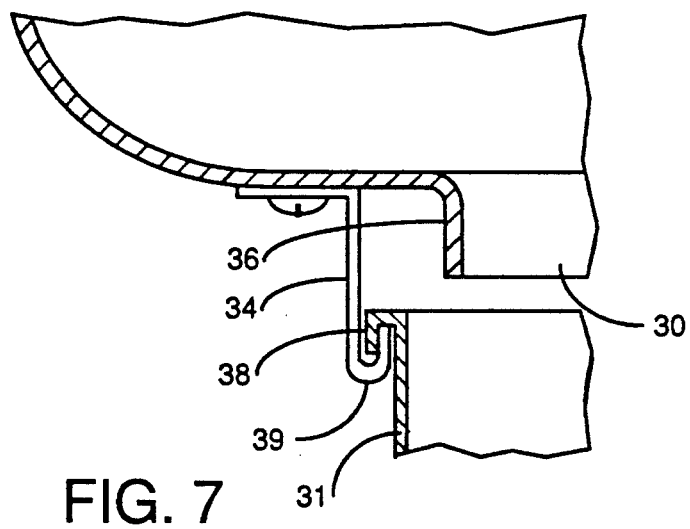
FIG. 7 is a close-up partial sectional view illustrating the engagement between the lip of the ash-catcher pan and the engaging flange of the bracket.

As best seen in FIGS. 2 and 4, the ash-catcher pan 31 is supported by one or more brackets 34. The ash-catcher pan brackets 34 are preferably equally spaced about the periphery of the circular opening 30 in the bottom bowl 10. As illustrated in FIGS. 6 and 7, the bottom bowl 10 further preferably includes a lip 36 around the circular opening 30. This lip 36 assists in directing falling ash from the base of the bottom bowl 10 into the ash-catcher pan 31.

The ash-catcher brackets 34 preferably fit within embossed recesses 37 (not shown) in the base of the bottom bowl 10.

Figure 5:
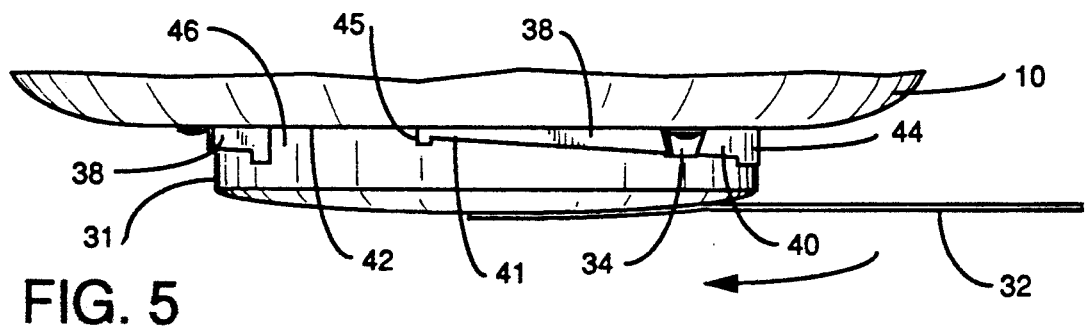
FIG. 5 is an elevational view of the ash-catcher assembly of the present invention in the closed air draft position.
Figure 7A:
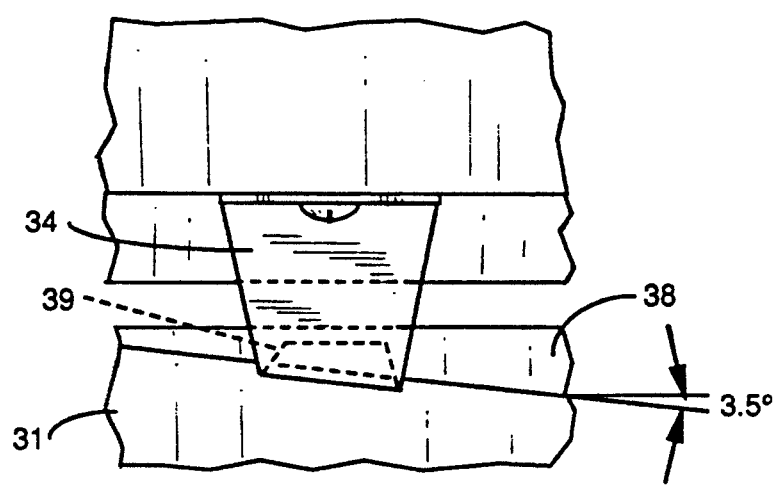
FIG. 7A is a side elevational view of the engaging flange of FIG. 7.

As further illustrated in FIGS. 7 and 7A, the ash-catcher brackets 34 include an ash-catcher pan engaging flange 39 adapted to slidably support the ash-catcher pan 31. As best illustrated in FIGS. 5 and 6, the ash-catcher pan 31 preferably includes at least one lip 38 about the periphery of the pan 31. This lip 38 preferably includes a wide end 40 and a narrow end 41. The lip 38 engages the engaging flange 39 of the bracket 34 as illustrated in FIGS. 5, 6, 7 and 7A.

As illustrated in FIG. 5, when the handle 32 of the pan 31 is rotated in a clockwise direction, the wide end 40 of the lip 38 engages the brackets 34, forcing the pan 31 up until it abuts the underside 42 of the bottom bowl 10. When positioned in this manner, the ash-catcher pan 31 operates to close the air draft in the bottom bowl 10.

As illustrated in FIG. 6, when the handle 32 of the ash-catcher pan 31 is rotated counterclockwise, the narrow end 41 of the lip 38 engages the brackets 34, lowering the ash-catcher pan 31 away from the underside 42 of the bottom bowl 10, and opening the air draft in the bottom bowl 10 by allowing air to enter the space created between the top lip 43 of the ash-catcher pan 31 and the underside 42 and circular opening 30 in the bottom bowl 10. This air flow is illustrated by dotted arrows in FIG. 6. Suprisingly, it has been discovered that the air flow patterns created by the open air draft of the present invention allow charcoal contained on the lower grate 23 to be lit without lighter fluid, using a sheet of newspaper as the starter.

As further illustrated in FIG. 7A, the bracket engaging flange 39 has a taper generally corresponding to the taper on the lip 38 of the ash-catcher pan 31 to further enable the slidable rotation of the pan 31 on the brackets 34. In a preferred embodement of the invention, both the lip 38 and the engaging flange 39 have a taper of about 3.5° with respect to the horizontal.

As further illustrated in FIGS. 2 and 5, the pan lip 38 preferably further includes a first stop 44 at the wide end 40 of the lip 38 and a second stop 45 at the narrow end 41 of the lip 38. These stops 44 and 45 limit slidable movement of the pan with respect to the pan lip engaging flanges 39 by abutting the flanges 39 as the pan 31 is rotated to either end of the pan lip 38.

As best seen in FIG. 5, the ash-catcher pan 31 preferably includes a plurality of tapering lips 38, each tapering lip being separated by an incursion 46 of sufficient width to allow the ash-catcher pan 31 to be positioned on the brackets 34 and to be dropped past the brackets 34 for removal of the ash-catcher pan 31.

As illustrated in FIG. 8, the kettle grill 1 of the present invention preferably further includes a lid catch bracket 50 mounted to the internal surface of the lid 11, the bracket 50 consisting of a pair of hooked portions 52 connected by a mounting flange 53 to the internal surface of the cover 11. The hooks 52 allow the cover 11 to be hung from the rolled lip 51 of the bottom bowl 10 when the cover 11 is not in use.

As illustrated in FIGS. 1, 2, and 8, the kettle grill 1 of the present invention preferably further includes one or more handles 13 connected to the kettle More preferably, the kettle 1 includes one handle 13 attached to the cover 11 and a second handle 13 attached to the bottom bowl 10 as illustrated in FIGS. 1 and 2. As illustrated in FIG. 8, each handle 13 preferably includes a heat insulating washer 60 positioned between the outer surface 61 of the cover 11 and the bases 62 of the handle 13. These heat insulating washers 60 may be fabricated of any heat insulation material known in the art, including card-board-like material fabricated of refractory-type fibers, ceramic material, and any other durable heat insulators known to those skilled in the art.

Figure 9:
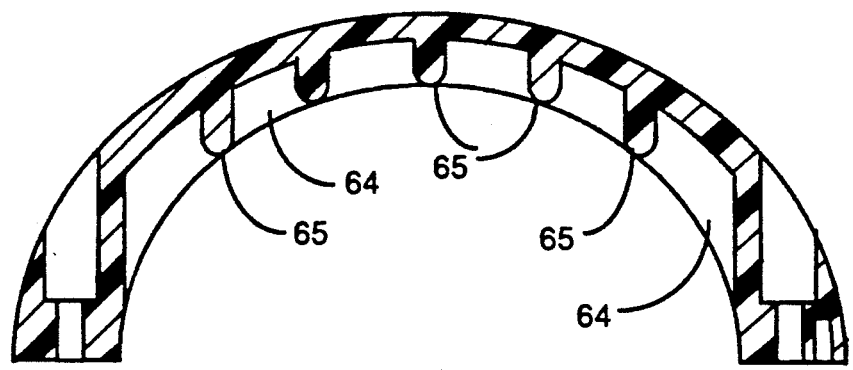
FIG. 9 is a front elevational sectional view of the preferred handle for use with the kettle grill of the present invention.

As illustrated in FIG. 9, each handle 13 preferably includes a substantially hollow interior 64, the handle itself being supported by a series of internal support ribs 65. The handle 13 is preferably fabricated of a heat-resistant material having a low heat transfer coefficient, such as phenolic materials known to those skilled in the art.

Figure 10:
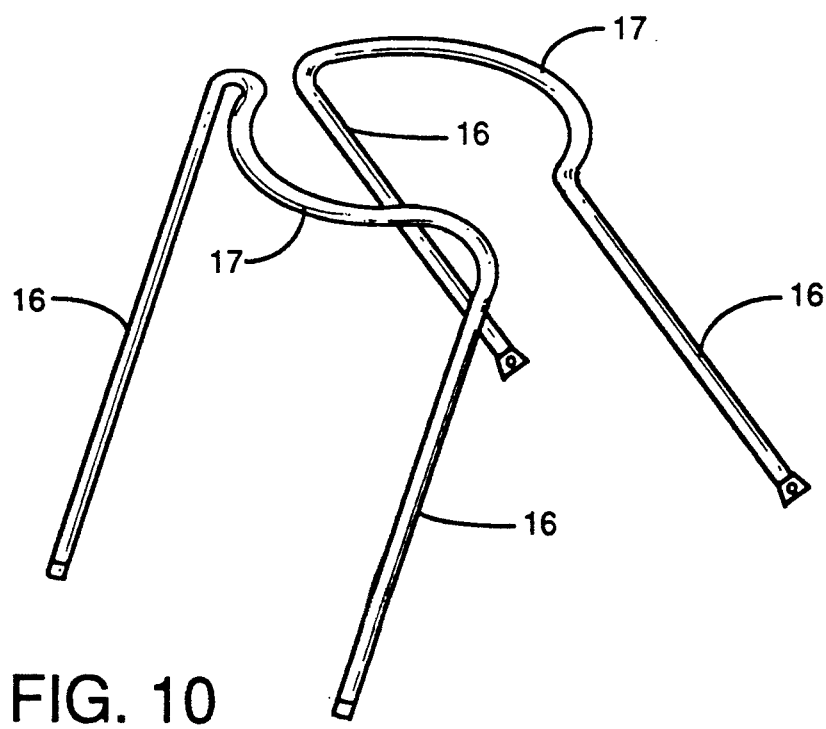
FIG. 10 is a perspective view of a leg assembly for use with the kettle grill of the present invention.

FIG. 10 discloses in greater detail the leg assembly 15 illustrated in FIGS. 1 and 2. This leg assembly 15, as discussed previously, includes a pair of tubular legs 16 connected by an attachment flange 17. As illustrated, the attachment flange 17 is preferably shaped to conform to the underside 42 of the kettle bottom bowl 10. In the embodiment shown in FIGS. 1 & 2, because the bottom bowl 10 has a circular configuration, the attachment flange 17 has a conforming semi-circular configuration.

While the specific embodiments disclosed herein have been illustrated and described, numerous modifications to those embodiments will now be readily apparent to those skilled in the art. Such modifications, while not significantly departing from the spirit of the invention, are intended to be embraced within the scope of protection of the following claims.

We claim:

1. A barbecue grill assembly comprising a grill base for containing a heat source, a plurality of legs supporting the base, and a grilling surface positioned on the base above the heat source, an ash-catcher assembly comprising an ash-catcher pan positioned below an opening in the grill base, said opening being sized and positioned to allow ashes from said heat source to fall through said opening and into said ash-catcher pan, means for adjusting said ash-catcher pan in a vertical direction to vary the size of an opening formed between said ash-catcher pan and said grill base, said ash catcher tray including a handle for moving said ash-catcher pan to a closed air draft positioned and an open air draft position with respect to the opening in said grill base.

2. The ash-catcher assembly of claim 1 wherein said ash-catcher pan is supported below said grill base by bracket means comprising a plurality of brackets spaced about the periphery of said opening in said base.

3. The ash-catcher assembly of claim 2 wherein said means for adjusting said ash-catcher pan includes at least one lip about the periphery of said pan, said lip having a taper defined by a wide end tapering to a narrow end, said wide end corresponding with said closed air draft position, each of said brackets having a pan lip engaging flange, said engaging flange having a taper substantially corresponding to said taper of said pan lip, said engaging flange adapted to slidably support said pan lip.

4. The ash-catcher assembly of claim 3 wherein said pan lip has a first stop at the wide end and a second stop at the narrow end for limiting slidable movement of said pan with respect to said pan lip engaging flange.

5. The ash catcher assembly of claim 4 wherein said ash-catcher pan includes a plurality of tapering lips about the periphery of said pan, each said tapering lip being separated by an incursion of sufficient width to allow said ash-catcher pan to drop past said pan lip engaging flanges for removal of said ash-catcher pan.

6. A barbecue grill assembly as in claim 1 further comprising, a plurality of legs connected to said base, a lid, a grid for supporting food above a heat source contained in said base.

7. The kettle grill of claim 6, further including a lid catch bracket mounted to the internal surface of said lid, said bracket comprising a pair of hooked portions connected by a mounting flange to said lid.

8. The kettle grill of claim 6, further including at least on handle attached thereto, said handle comprising a phenolic material having a substantially hollow interior supported by a plurability of internal support ribs, said handle being separated from said kettle by a heat insulating washer.

9. The kettle grill of claim 6, said legs comprising one or more two-legged tubular members, each said tubular member having an attachment flange joining the two legs comprising each said two-legged tubular member, said attachment flange conforming to a lower surface of said base and adapted to be fastened thereto.

* * * * *